3,442,370
SANITARY BELT CONVEYOR
Richard J. Goodale, Box 268, Watsonville, Calif. 95076
Filed Jan. 3, 1967, Ser. No. 606,660
Int. Cl. B65g 15/60
U.S. Cl. 198—192                                                 8 Claims

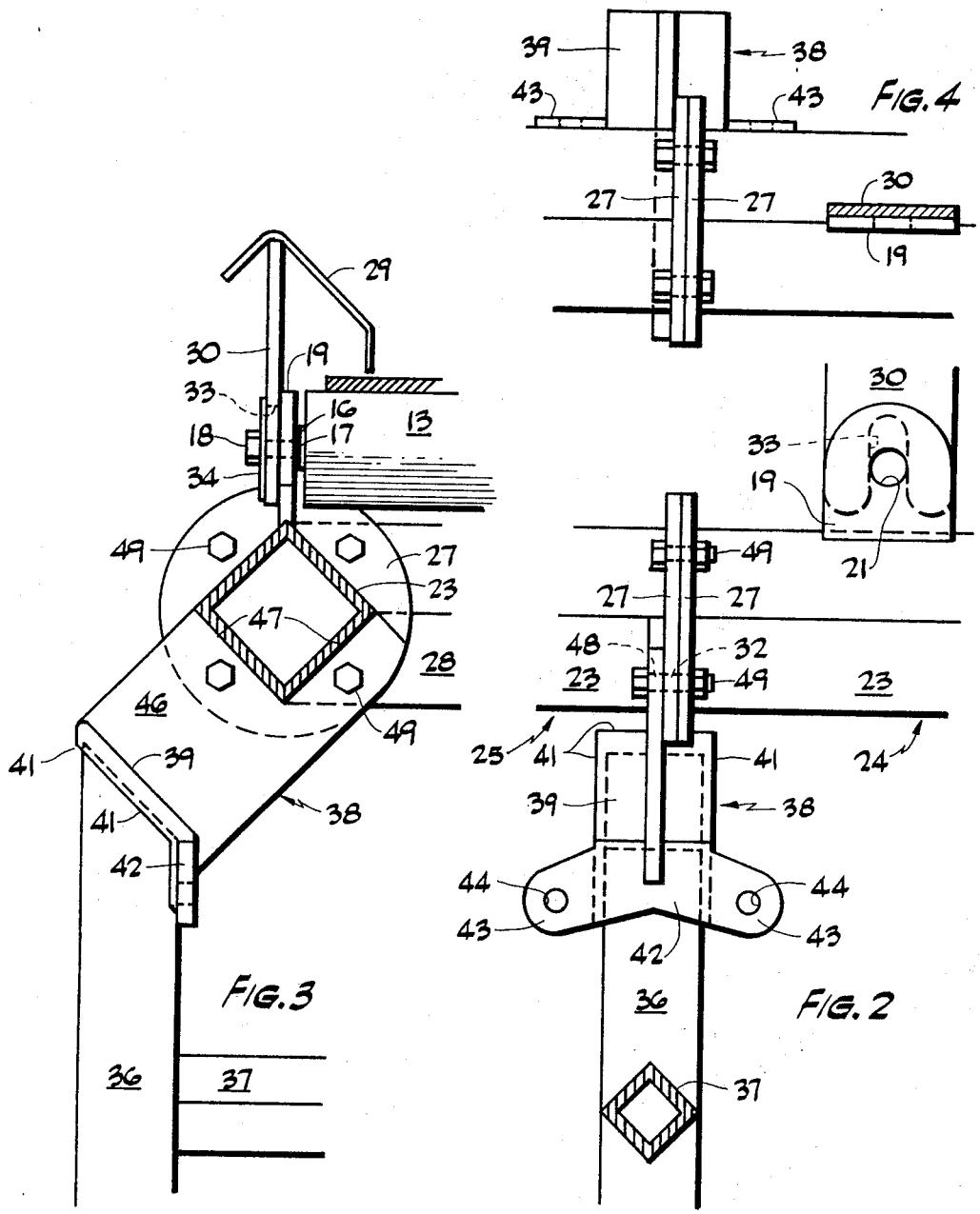

ABSTRACT OF THE DISCLOSURE

A sanitary belt conveyor is constructed so that all the surfaces of the belt supporting means, frame and rollers, are inclined with respect to the horizontal and without pockets so that liquids and solids fall or are easily washed therefrom.

---

The present invention relates to structural features of a sanitary belt-conveyor, one that is particularly intended for use in carrying food products in food processing plants where it is necessary to clean such a conveyor at least once a day with water and steam, and where places for lodgement of food particles must be reduced to a minimum for sanitary reasons and for ease in cleaning of the structure.

The belt supporting structures of the belt conveyors now in use have many horizontal surfaces and joints and hidden places that collect food particles, promote corrosion, and are hard to see or get at for cleaning and to clean. Also, such conveyors have required much on-the-site cutting, forming, and fitting of many parts in their construction, assembly, and erection.

Thus, it is an object of the present invention to devise a structure, or frame, for the support of a conveyor belt, and its rollers that consists of only two subassemblies, exclusive of the head end drive unit and the tail end belt tightening unit.

A further object of the invention is the devising of a belt conveyor frame that has all its parts exposed for easy cleaning.

Another object of the present invention is the devising of a belt conveyor frame without horizontal surfaces upon which food particles would easily collect, and which surfaces are easy to clean because of such nonhorizontalness.

Also, in the food industry, it is necessary to build conveyor structures out of materials that are highly resistant to corrosion, and, hence, expensive materials as compared to rust prone structural steel.

Thus, it is another object of the present invention to devise a belt conveyor structure that not only achieves the previous objects of the invention but, also, is light in weight as compared with the prior art devices, so as to conserve structural material.

These objects, and others as will be apparent from the following detailed description of an embodiment of the invention, are achieved by the construction of the conveyor, exclusive of belt, from a plurality of two subassemblies. One is an H-shaped leg section and the other is a ladder shaped horizontal section for joining to, extending between, and for support on two spaced apart such leg sections. Also, all of the main structural members are formed from lengths of square tubing, and those lengths that are horizontal have a tube edge uppermost of the tube so that all such horizontal tubes have all their faces inclined to the horizontal.

The construction outlined above is hereinafter described in detail as related to a specific embodiment of, and a modification thereof, of the invention illustrated in the accompanying drawings in which:

FIGURE 2 is an elevational view of a portion of the showing of FIGURE 1 taken as the direction of the arrow 2 of FIGURE 1, and with adjacent parts omitted.

FIGURE 3 is a left end view of FIGURE 2 with portions of adjacent parts that were omitted from FIGURE 2.

FIGURE 4 is a plan view of FIGURE 2.

The views of the drawings do not show the ends of the conveyor, the drive end and the take-up end. The showings of the drawings are of the construction of a portion of an endless flat belt conveyor support structure between its ends as it is this part of the conveyor that forms the subject matter of the present invention.

Figure 1:
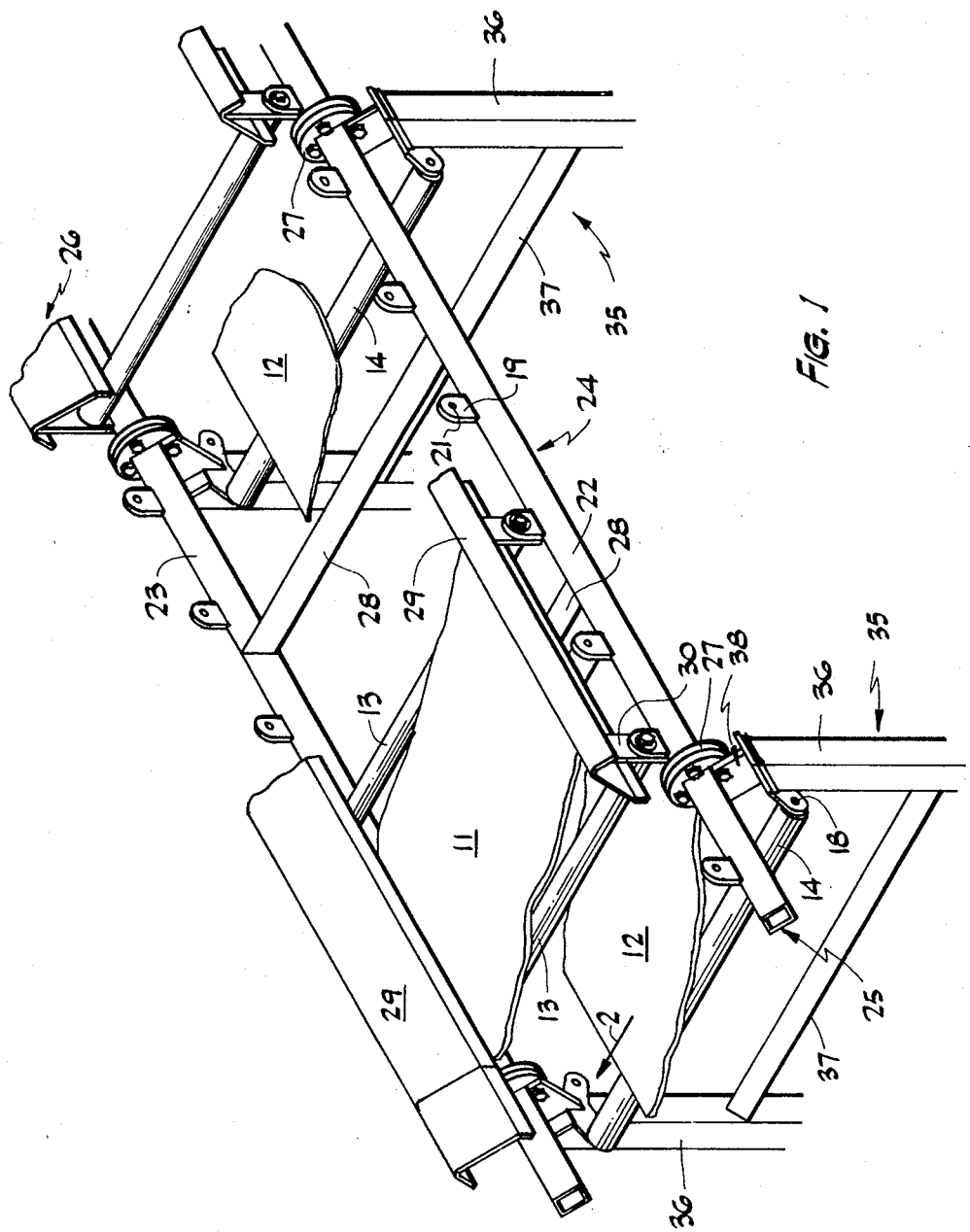
FIGURE 1 is an isometric view of a midportion of a conveyor embodying the present invention, the head and tail ends thereof being cut away.

In the isometric view of FIGURE 1 there is shown a portion of the upper run 11 of the belt, the tight run thereof, and therebelow portions of the lower run 12 of the belt, the slack run thereof. The upper 11 and lower 12 portions illustrated are parts of a single endless belt, and the portions travel in opposite directions. It is on the top surface of the upper run 11 that a material such as food is carried for whatever purpose the conveyor is to serve. The upper run is supported by a series of closely spaced upper rollers 13 that extend across and beyond the width of the belt and that are axially normal to the direction of travel of the belt. The lower run is also supported by rollers 14, similar to upper rollers 13, that are axially normal to the run of the belt and are longer than the belt is wide. The spacing of the lower rollers 14 is much greater than that of the upper rollers as the lower run, as herein designed, does not carry material.

Each of the rollers 13, 14 has a bearing 16 in each end thereof, and each bearing is supported on a journal 17 that is internally and axially threaded for a cap screw 18 that clamps the journal to a support post 19 that is in the form of a small plate. The post has a hole 21 therethru to fit and receive the shank of the cap screw. The upper edge of each post 19 is rounded in the plane of its plate, and its lower end is straight in the plane of its plate. The lower end of each of the posts is secured to the upper edge of a square tubular side rail of which there are two 22, 23, one along and below each side of the upper belt 11 and its series of rollers 13. It is to be noted that a diagonal of each of the tubes 22, 23 is perpendicular to the plane of the belt 11 and, also, the whole device is intended to be installed so that such diagonals are vertical. The upper ends of the posts 19 are rounded and the side rails 22, 23 are on edge so that all exposed surfaces thereof, both upper and lower, slope from the horizontal. Such sloping of surfaces reduces or prevents the lodgement of material thereon and aids in the cleaning thereof. As compared to horizontal surfaces, such inclined surfaces are self cleaning.

The side rails 22, 23 are divided into sections of which there is shown, in FIGURE 1, one complete one 24 and parts of two others 25, 26 contiguous to the complete one 24. Each of these sections is composed of its side rails 22, 23 with each rail having at each end thereof a circular flange 27; two cross braces 28 secured between and to the side rails to make them a single unit; several of the rollers 13 and their support posts 19; and along, above and slightly inward of each edge of the belt's upper run 11, an edge of a side guard 29 having secured thereto support clips 30.

Each of the cross braces 28 is in the form of a square sectioned tube placed with a diagonal of the section normal to the belt and vertical, and each end of a cross brace is notched to conform to a side rail with a diagonal of the brace section congruent with an edge of the side rail. Each of the flanges 27 is in the form of a flat circular disc secured to a side rail end with the disc's faces normal to and coaxial of the longitudinal axis of such rail. Four bolt holes 32 are formed thru each flange and they are equally spaced about and radially of the flange, and the holes in abutting flanges are in registry. The edge surfaces of the flanges are inclined to the horizontal for the same reasons as for the inclination of the side rail surfaces, to have them be self cleaning. Each of the two side guards 29 of a section are formed of elongated strips of sheet metal with parallel edges and with one edge thereof slightly inward of an edge of the upper run of the belt and spaced slightly from the supper surface of such belt run. The guard slopes upward and outward from the belt with the upper edge portion rounded outward and downward to its other edge. To the underside of the rounded upper edge portion of the guard there are secured the spaced apart support clips 30, each in the form of a rectangular strip having its lower end bifurcated to form a slot 33 to receive the shank of one of the roller supporting cap screws 18 and to be clamped thereby to one of the roller support posts 19. The clips' slot 33 allows adjustment of the inner and lower edge of the guard with respect to the surface of the belt. A large circular washer 34 is placed under the head of each cap screw 18, and the radius of this washer is dimensioned so that the washer will always cover the upper and outer end of the slot 33 so as to prevent food particles from entering the slot from its upper end. Also, each of the posts 19 extends above its cap screw opening 21 far enough to always cover the upper and inner end of the slot 33 in the clip regardless of the position of the screw shank in the slot 33. Further, the open lower end of the slot 33 allows wash water to drain from the slot. The ends of the legs forming the slot 33 should be rounded or inclined to reduce the adherence of food or water thereto. The ends of the guards 29 butt each other from section to section.

Any number of sections such as the section 24 may be joined together to obtain a desired conveyor length as indicated by the contiguous section portions 25, 26 with a drive roller and drive means secured to one end of the conveyor and a tensioning roll secured to the other end. All of the sections are supported on similar bents 35 and the conveyor may be extended during construction by adding thereto one section 24 and one bent 35 at a time.

Each of the bents 35 is composed of a pair of legs 36 spaced apart and secured together by a cross member 37, and a cap 38 that covers the upper end of each leg. Each of the bent's legs is formed of tubular material that is square in cross section with the two legs of a bent being in parallel registry with opposed sides, and with the upper end of each leg cut off in a plane normal to a side and sloping downwardly and inwardly of the bent. The cross member 37 is, also, of square tubular cross section and is placed with an edge thereof uppermost as are the cross braces 28 of the horizontal sections 24.

All of the leg caps are the same, from side to side of the conveyor they are interchangeable. Each of the caps is formed with an inclined plate 39 that covers the upper end of the leg and is flanged downward around the leg. This flange has shallow portions 41 along three of the upward edges of the leg's end with, comparatively, a much deeper portion 42 on the inner face of the leg. The inner face of the leg being that in opposition to the other leg of the pair of a bent. This inner flange portion 42 extends downwardly and outwardly of the adjacent sides of the leg to form two ears 43. Each of the ears 43 is formed with an opening 44 adapted to receive a roller cap screw 18 therethru with the axis of each opening being parallel to the other and normal to the inner face of the leg. The two cap screws and two of the opposed ears of a bent support between them on of the lower rollers 14 that support the lower run 12 of the belt. A roller 14 extends between the two cap ears on one side of the bent, and the other two cap ears on the other side of the bent are not used. However, this arrangement allows the use of a single cap design instead of having to have two designs, one for one side of the conveyor and the other for the other side. A support arm 46, or bracket, is centered on each cap plate 39 and extends upwardly and inwardly of the bent to a position below and in contact with one of the side rails 22, 23, the one closest to the particular cap. The arm 46 is shown in the form of a flat plate having its flats normal to the side rails, in the plane of the bent's legs and cross brace. The upper end of the arm 46 is formed with a V-shaped notch 47 that opens upwardly and is shaped to conform to the lower portion of the rails. The extent of the edges of the notch 47 is such that they are less than or equal to the width of the adjacent sides of the rail that they contact and support so as to reduce the possibility of food particles lodging in the V. Also, it is to be noted that all edges of the arm 46 and V 47 slope downwardly so that the possibility of food lodgement is unlikely and such surfaces are self cleaning. Two bolt holes 48 are provided in each of the arms 46 of a bent and located so as to register with the lower two bolt holes 32 in the rail flanges 27 when the arms are placed against such flanges. This allows the arms and their bent to be bolted to the side rails of the conveyor and for such bolts 49, to, also, secure together the butting flanges 27 of adjacent conveyor sections such as the ones 25, 26 joining to each end of the centrally shown section 24 of FIGURE 1.

Figure 5:
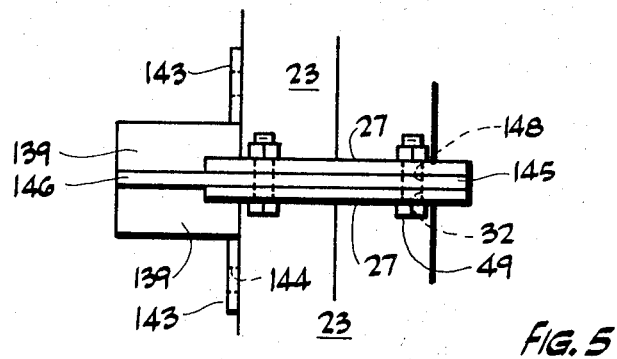
FIGURE 5 is a plan view similar to FIGURE 4 showing a modification of the invention.
Figure 6:
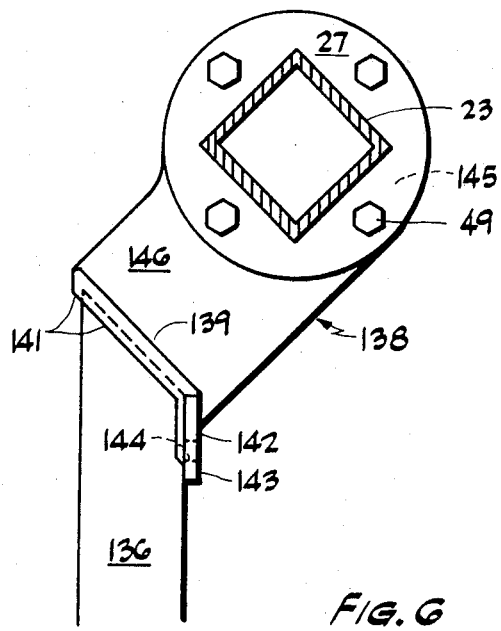
FIGURE 6 is an end view of FIGURE 5.

FIGURES 5 and 6 depict a modification of the previously described leg cap 38. FIGURE 5 is a plan view similar to that of FIGURE 4, and FIGURE 6 is a left end view similar to that of FIGURE 3 but with details of the structure not relevant to the invention of the modification omitted. The same and similar parts of the modification to those of the previously described structure are designated by raising the reference number by one hundred. The unmodified portions of the adjacent side rails 23 and their end flanges 27 are numbered as in the first disclosed embodiment.

In FIGURES 5 and 6 there is shown a leg cap 138 composed of a cap plate 139 that covers the slanted open end of one leg 136 of a bent, and has shallow flanges 141 that lap three sides of the leg adjacent its end and one deeper flange 142 on the inner side of the leg that extends downwardly and outwardly of the leg to form two ears 143 that are pierced by bolt openings 144; and located centrally of the cap plate, a support arm 146 that extends upwardly and inwardly of the leg in the form of a flat plate having its plane in the plane of the bent and terminating in a disc 145 that, in the assembled conveyor, locates between adjacent end-flanges 27 of the side rails of adjacent conveyor sections. The support arm disc 145 is provided with four bolt holes 148 located in registry with the bolt holes 32 of the side rail flanges 27. Bolts 49 in the flange and disc holes secure together the opposed flanges 27 and the support arm disc 145.

The above disclosed modification of the invention differs from the principal disclosure only in the shape of the upper end termination of the support arms 46 and 146 of the two disclosures. In the first disclosure, the arm terminates in a notch adapted to fit the lower side of a side rail 22, 23, while in the second disclosure the arm terminates in a disc 145 adapted to be placed between and be congruent with adjacent end flanges of adjacent conveyor sections 24, 25, 26. In each of the two disclosures, the support arm and its upper end termination is secured to and is part of the supporting bents for the support of the conveyor sections, there being two of the caps, a right and a left located one, integrated into each bent.

This disclosed modification of the invention is desirable in being secured to the conveyor sections by four bolts 49 instead of two, and by its joint with the sections of the conveyor being more open to cleaning.

From the foregoing it may be seen that applicant has disclosed a belt conveyor structure that is simple and clean in its construction, that has all of its surfaces on a slope so that particles of material are not likely to lodge thereon and so that the structure's surfaces are readily accessible for and easy to clean. Further, the disclosed structure separates into two subassemblies with each being easily movable and joinable in any number to form a conveyor structure.

Having thus described my invention, its construction and use, I claim:

1. A leg cap adapted to act as a connector between a belt conveyor upright supporting leg and an upper-roller supporting rail of such conveyor, said rail extending transversely of such leg, and to act as the support for a journal of a such conveyor's lower roller, such rollers acting as supports for the upper and lower runs of an endless belt, said cap comprising: a plate covering the end of and inclined to the axis of such a leg, integral with said plate and along such a leg a dependent flange with opposite and laterally extending portions forming an ear outward to each of opposite side edges of said plate and such a leg, each ear formed with an opening therethru with the axes of said openings parallel to each other and transverse such a leg so that each ear is a mirror image of the other about an axial plane of such a leg, each ear opening being adapted to receive therein a lower roller journal support means, an arm secured to said plate medially thereof and of said ear openings, said arm extending so medially and upwardly from said cap and terminating in a support portion adapted for integration with such an upper-roller supporting rail.

2. The combination of claim 1 in which said dependent flange is continuous around the edges of said plate along the periphery of such a leg.

3. The combination of claim 1 in which said support portion is in the form of a plate having its major surfaces substantially coplanar with the axis of such leg and having an upper edge, said upper edge being formed with a notch adapted to conform to a portion of such a longitudinal supporting member, and said portion formed with a bolt hole therethru.

4. The combination of claim 1 in which said support portion is in the form of a plate having its major surfaces substantially coplanar with the axis of such leg and said arm, and said plate being formed with bolt holes extending transversely thereof.

5. In combination with a pair of caps as set forth in claim 1, a bent for the support of a pair of upper roller supporting rails, said bent comprising: a pair of substantially parallel and spaced apart tubular legs, a tubular bar extending between and secured to said legs for the spacing and integration of said legs and bar into such bent, said bar being secured to said legs spaced from the ends thereof, said bar's transverse surfaces sloping downwardly, and a said cap closing the upper end of each of said legs.

6. The combination of claim 5 in which said tubular legs and bar are square in cross section.

7. A belt conveyor structure subassembly section composed of a plurality of congruent parallel and spaced apart rollers adapted to be belt supporting, two lines of parallel upright posts supporting the ends of said rollers, a pair of parallel spaced apart congruent side rails, each of said rails having secured thereto and therealong a line of said posts, each of said posts having its base directly integrated with a said side rail, each of said rails being so formed and located with respect to said posts that all surfaces of said each rail slope downwardly thereof away from said line of posts, section coupling means secured to each rail end, and, coplanar with said rails, a brace extending between, secured to and spacing said rails, all surfaces of said brace, posts, and coupling means sloping downwardly with respect to the plane of said rails and brace.

8. The combination of claim 7 in which said rails are tubular.

References Cited

UNITED STATES PATENTS

| | | | |
|---|---|---|---|
| 2,179,187 | 11/1939 | Kendall | 198—192 |
| 2,999,582 | 9/1961 | Ramer | 198—192 |
| 3,200,940 | 8/1965 | Higgins | 198—192 |

FOREIGN PATENTS

| | | |
|---|---|---|
| 1,411,795 | 8/1965 | France. |

ANDRES H. NIELSEN, *Primary Examiner.*